United States Patent
Trevillyan

(10) Patent No.: US 7,887,090 B2
(45) Date of Patent: Feb. 15, 2011

(54) IGNITION DELAY MODULE FOR AN AIRBAG INFLATOR

(75) Inventor: Dennis A. Trevillyan, Plant City, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 788 days.

(21) Appl. No.: 11/778,847

(22) Filed: Jul. 17, 2007

(65) Prior Publication Data

US 2009/0020032 A1 Jan. 22, 2009

(51) Int. Cl.
*B60R 21/26* (2006.01)
(52) U.S. Cl. ................................ 280/741; 280/736
(58) Field of Classification Search ............. 102/286, 102/288, 289, 290; 280/741
See application file for complete search history.

(56) References Cited

U.S. PATENT DOCUMENTS

| | | | |
|---|---|---|---|
| 3,377,955 A * | 4/1968 | Hodgson James E | 102/289 |
| 4,998,751 A | 3/1991 | Paxton et al. | |
| 5,345,873 A * | 9/1994 | Lauritzen et al. | 102/290 |
| 5,386,775 A * | 2/1995 | Poole et al. | 102/289 |
| 5,427,030 A | 6/1995 | Kidd et al. | |
| 5,501,152 A * | 3/1996 | Zeuner et al. | 102/292 |
| 5,593,181 A | 1/1997 | Walker et al. | |
| 5,682,013 A | 10/1997 | Smith et al. | |
| 5,743,559 A | 4/1998 | Nakajima et al. | |
| 5,967,550 A | 10/1999 | Shirk et al. | |
| 6,071,364 A | 6/2000 | Canterberry et al. | |
| 6,314,889 B1 | 11/2001 | Smith | |
| 7,073,819 B2 * | 7/2006 | Castagner et al. | 280/736 |
| 7,188,567 B1 | 3/2007 | Italiane et al. | |
| 2003/0155758 A1 * | 8/2003 | Castagner et al. | 280/741 |
| 2005/0156420 A1 | 7/2005 | Edwards et al. | |

FOREIGN PATENT DOCUMENTS

EP 1344693 A2 9/2003

* cited by examiner

*Primary Examiner*—Troy Chambers
(74) *Attorney, Agent, or Firm*—Markell Seitzman; Lonnie R. Drayer; David L. King

(57) ABSTRACT

An ignition delay module (10) for use in an airbag inflator (100, 200) has an ignition delay module housing (11). The ignition delay module (10) separates the inflator (100, 200) into two chambers (40, 60). A pyrotechnic tablet (2) is positioned inside the ignition delay module housing (11). Upon activation of the inflator (100, 200) the ignition delay module (10) prevents a gas generant (62) in a second chamber (60) of the inflator (100, 200) from igniting until at least a portion of the pyrotechnic tablet (2) is burnt. Preferably a burn inhibitor layer (3) is affixed or otherwise applied to a surface of the pyrotechnic tablet (2). The ignition delay module housing (11) has a first end with a plurality of openings (7) and a second end with openings (20) blocked by the pyrotechnic tablet (2) at the burn inhibitor layer (3) such that upon an ignition of a gas generant (42) in the first inflator chamber (40), the burn inhibitor layer (3) is overcome and the pyrotechnic tablet (2) is ignited and burns to expose the openings (20) in the second end of the ignition delay module housing (11) causing a time delay before igniting a gas generant (62) in the second chamber (60). The ignition delay module (10) is usable in either a pyrotechnic inflator (100) or a hybrid inflator (200).

8 Claims, 4 Drawing Sheets

IGNITION DELAY MODULE FOR AN AIRBAG INFLATOR

FIELD OF THE INVENTION

An airbag inflator has an ignition delay module that aids in controlling the timing of the ignition of a portion of the gas generant in the inflator. The inflator can be a pyrotechnic inflator employing only a burnable a gas generant or a hybrid inflator employing both a stored inert gas and a burnable gas generant for producing inflation gasses.

BACKGROUND OF THE INVENTION

An airbag inflator provides gasses to inflate an airbag to protect a vehicle occupant during a crash. An airbag inflator can be a pyrotechnic inflator employing only a burnable a gas generant or a hybrid inflator employing both a stored inert gas and a burnable gas generant for producing inflation gasses. These two types of inflators are well known in the art and are commonly used in the automotive industry. The requirements for these safety devices have evolved dramatically as the knowledge and science of vehicle crash scenarios has evolved. As a result the need exists for inflators to provide a very reliable and predictable inflation of an airbag that can adjust the impact of the airbag on vehicle occupants.

Airbags must provide protection for a variety of vehicle occupants and seating positions as defined in the Federal regulations. One way to meet this requirement is to provide an airbag inflator that provides a range of inflation gas output. Currently this is most often satisfied using a dual stage inflator that provides both a low and high gas output. The low output condition is used for out of position and small stature vehicle occupants while the higher output is used for properly positioned and large stature vehicle occupants. An ideal inflator would be able to provide for both conditions with a single stage. To accomplish this goal the initial performance must match the low output performance for the first part of the deployment and then accelerate the output to achieve the higher output. The ideal inflator would use only one deployment signal and would require no additional input from the electronic control unit. This type of gas output is typically described as an "S-Curve".

In prior art airbag inflators this S-Curve performance is simulated by the use of two igniters that are typically activated sequentially causing an initial burning of a portion of a gas generant within an inflator and thereafter the second igniter is activated causing a second portion of the gas generant to be ignited. This enables the airbag to initiate deployment with a less aggressive or softer impact on the vehicle occupant and then to increase the cushioning forces to provide maximum protection.

The complexity of the timing and use of two separate igniters adds to the concern of component failure or malfunction. Almost all of these low to high output inflators require the use of two separate igniters activated sequentially by separate signals.

The present invention can provide the desired low to high gas output without using two igniters. The invention provides a reliable and extremely predictable delay in the combustion of the internally held gas generant material within the inflator housing of either a pyrotechnic or a hybrid inflator.

SUMMARY OF THE INVENTION

An ignition delay module for use in an airbag inflator has an ignition delay module housing; a pyrotechnic tablet positioned inside the ignition delay module housing; and wherein upon igniting the inflator, the ignition delay module prevents a second portion of the inflator to ignite until at least a portion of the pyrotechnic tablet is burnt. Preferably a burn inhibitor layer is affixed or otherwise applied to a surface of the pyrotechnic tablet. The ignition delay module when placed in the inflator separates the inflator into two chambers, the ignition delay module housing has a first end with a plurality of openings and a second end with a plurality of openings blocked by the pyrotechnic tablet at the burn inhibitor layer surface such that upon an ignition of the gas generant in the first inflator chamber, the pyrotechnic tablet is ignited and burns with the burn inhibitor layer to expose the openings in the second end causing a time delay before igniting gas generant in the second chamber. The ignition delay module is usable in either a pyrotechnic inflator or a hybrid inflator. A hybrid inflator contains an inert gas under pressure and the gas generant is separated into the first and the second quantities.

DETAILED DESCRIPTION OF THE INVENTION

Figure 1:
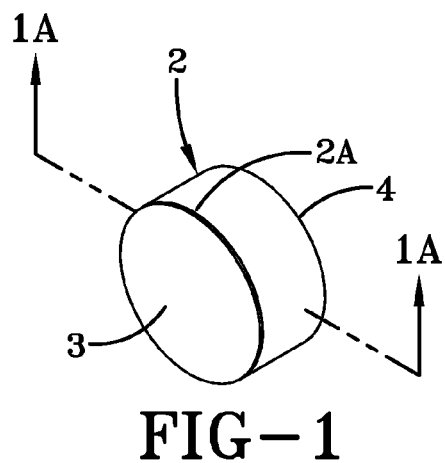
FIG. 1 is a perspective view of a pyrotechnic tablet with a burn inhibitor layer on one surface thereof.
Figure 1A:
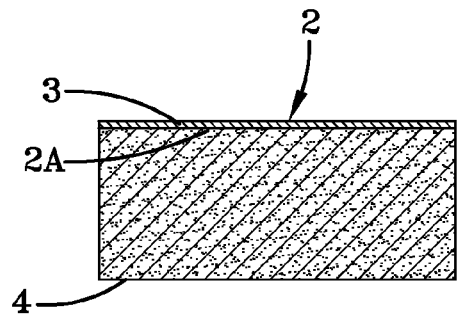
FIG. 1A is a cross sectional view of the pyrotechnic tablet of FIG. 1 taken along line 1A-1A.
Figure 2:
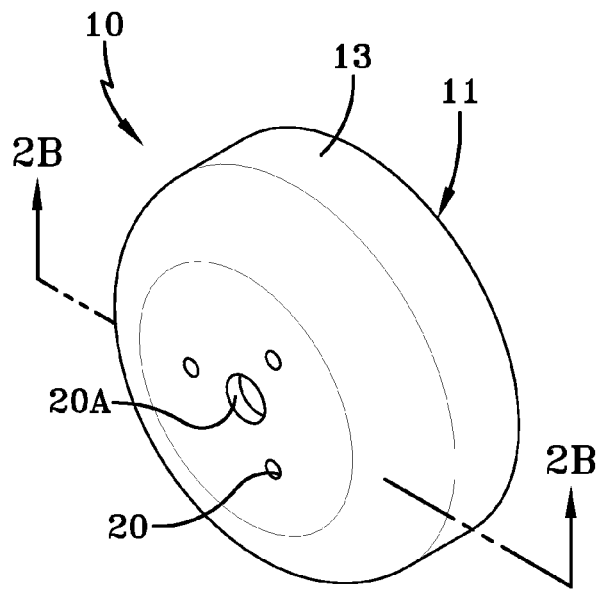
FIG. 2 is a perspective view of an ignition delay module of the present invention.
Figure 2A:
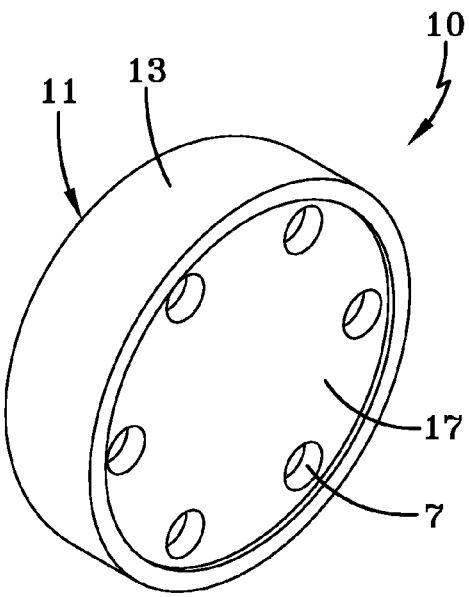
FIG. 2A is another perspective view of the ignition delay module of FIG. 2.
Figure 2B:
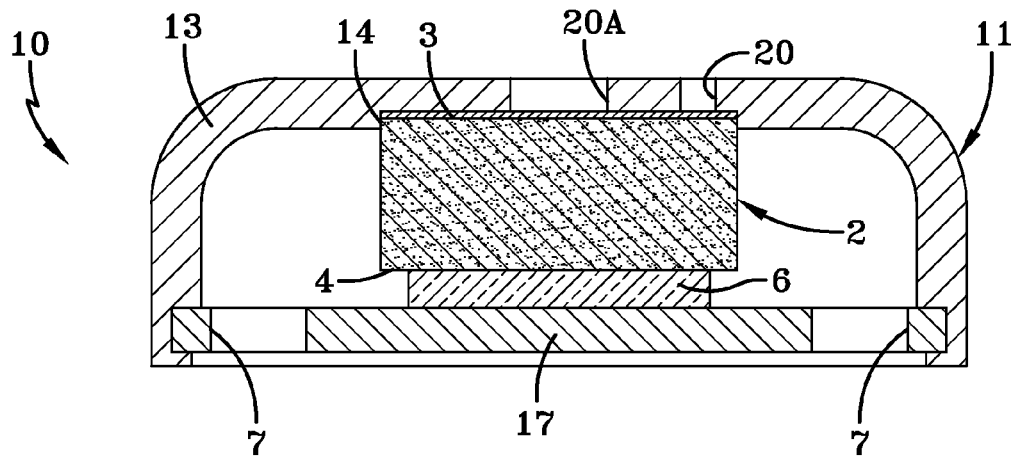
FIG. 2B is a cross section of the ignition delay module of FIG. 2 along line 2B-2B.

FIGS. 1-2B illustrate components of an ignition delay module 10 according to the present invention. FIG. 1 shows a tablet 2 comprising a pyrotechnic substance. As used herein and in the claims a "tablet" is understood to refer to a compressed or molded block of a solid material. Preferably the pyrotechnic tablet 2 comprises pyrotechnic formulations currently in use for airbag inflators. The use of exotic or potentially toxic materials found in military delay compounds or materials is avoided. In an exemplary embodiment, the pyrotechnic tablet 2 is made from a pyrotechnic composition comprising by weight: 33% 5-amino-1H-tetrazole; 50% strontium nitrate; 8% potassium nitrate; and 8% mica (muscovite). The formulation of such a pyrotechnic composition and a method of manufacturing such a pyrotechnic composition are taught in U.S. Pat. No. 7,071,364 B1 which incorporated herein in its entirety by reference. All of the external surfaces of pyrotechnic substance of the pyrotechnic tablet 2 are exposed with the exception of one unexposed surface 2A. The unexposed surface 2A has a burn inhibitor layer 3 applied to the pyrotechnic tablet 2 as illustrated. The burn inhibitor layer 3 can be a coating or a thin film applied directly to a surface 2A of a pyrotechnic tablet 2. The purpose of the burn inhibitor layer 3 is to retard or slow that surface 2A from burning during the deployment of the airbag. All other surfaces of the pyrotechnic tablet 2 are allowed to burn at the onset of airbag deployment as will be explained later. The burn inhibitor layer 3 is placed against an inside surface of a cup 13 as illustrated in FIG. 2B. As shown the pyrotechnic tablet 2 has a diameter of about 12 mm and a thickness of about 5 mm. The burn inhibitor layer 3 has a thickness of about 2 mm or less and preferably is a thin coating of a slow burning foil, paint, lacquer, shellac or varnish material. In an exemplary embodiment the burn inhibitor layer was a sprayed on clear lacquer of the type readily available from dealers of paint or general merchandise. All of these dimensions and materials can be adjusted to meet various performance criteria for the inflator.

With further reference to FIG. 2B, the ignition delay module 10 has an ignition delay module housing 11 comprising a cup 13 with a closure 17 crimped onto the cup. The cup 13 has a small counterbore recess 14 inside the cup 13 sized to mate with the pyrotechnic tablet 2 at the unexposed surface 2A. A plurality of small diameter openings or passages 20 extend through the cup 13 at the counterbore recess 14. These passages 20 along with a larger central opening 20A are sealed or blocked by positioning the pyrotechnic tablet 2 with the burn inhibitor layer 3 directly over these passages 20, 20A. A spacer or cushion 6 is provided adjacent a surface 4 of the pyrotechnic tablet 2 opposite the burn inhibitor layer 3. The spacer or cushion 6 preferably is a fiberglass material or another compressible material that can hold the pyrotechnic tablet 2 in the counterbore recess 14 between cup 13 and the closure 17 as shown. The closure 17 is placed onto the container cup 13 and secured to the cup by crimping. The closure 17 has a plurality of holes 7 therethrough. All of the holes 7 in the closure 17 are positioned in an unobstructed way radially outward of the pyrotechnic tablet 2. The holes 7 in the closure 17 act as open entries for burning generant material to enter into the ignition delay module 10 and ignite the pyrotechnic tablet 2. Burning of the pyrotechnic tablet 2 occurs first at the exposed surfaces of the pyrotechnic tablet.

Figure 3:
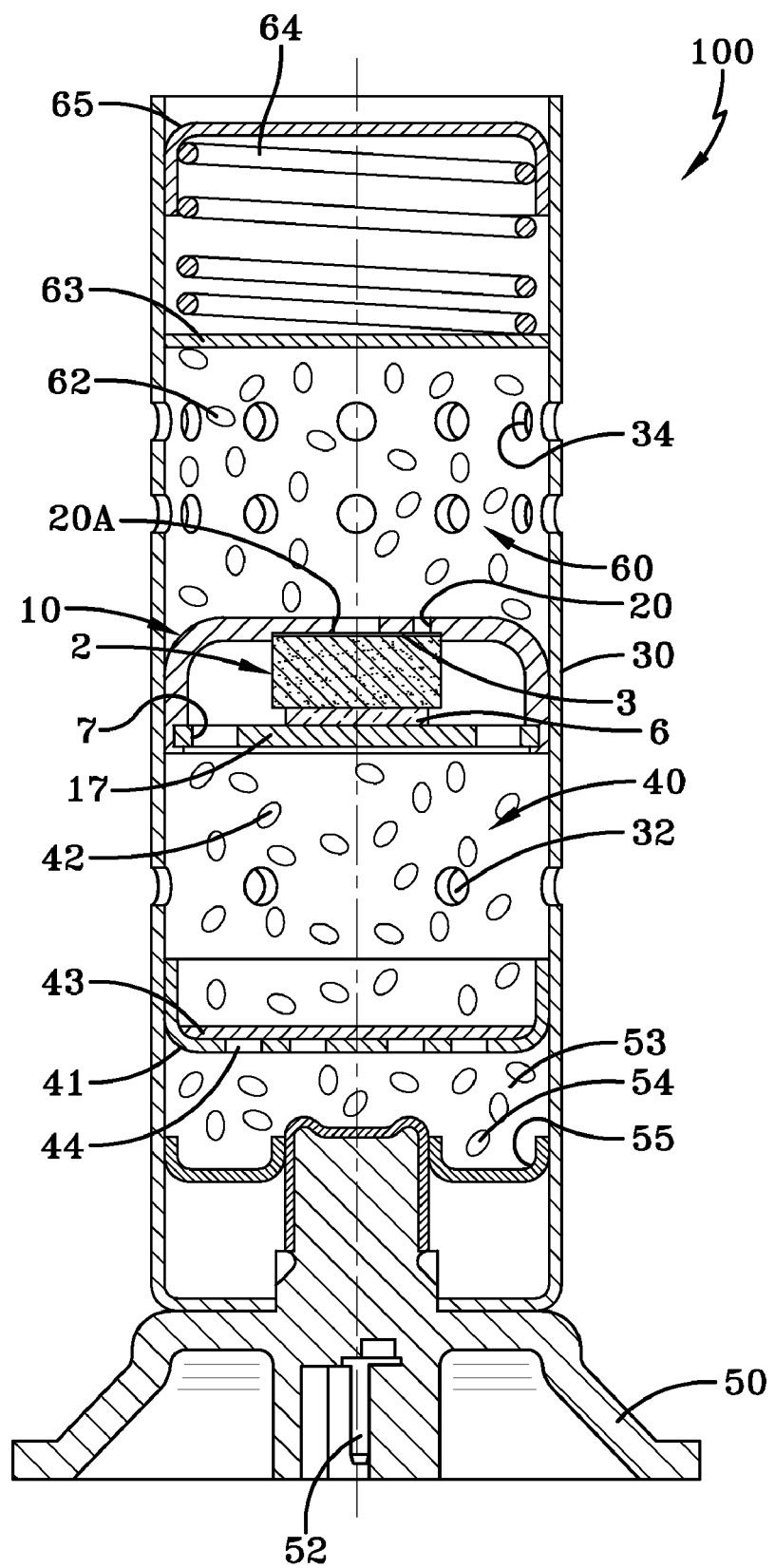
FIG. 3 is a cross section of a pyrotechnic inflator with the ignition delay module installed therein.

FIG. 3 shows a pyrotechnic type airbag inflator 100, which is a pyrotechnic device having a combustible gas generant contained in an inflator housing. The gas generant is typically ignited by an igniter or squib to start the gas generant burning causing the gasses generated to escape through one or more openings in the inflator housing to inflate an airbag. The ignition delay module 10 when assembled into a pyrotechnic inflator 100 as shown in FIG. 3 is positioned such that it separates the inflator into two chambers 40, 60. The first chamber 40 is adjacent to the closure 17 of the ignition delay module 10 and within that chamber 40 is a quantity of a gas generant 42 held between the ignition delay module 10 and a bulkhead 41. The bulkhead 41 has openings 44 therethrough that are sealed by a seal 43. At the opposite end of the ignition delay module 10 is the second chamber 60 also containing a gas generant 62 and held in place by a bulkhead 63, a spring 64 and an end cap 65 as shown. On each side of the ignition delay module 10 the inflator housing 30 has a plurality of vent holes 32, 34 therethrough to allow gasses to escape from the inflator and inflate an airbag upon deployment. As illustrated, the inflator 100 has an end cap 50 with a single igniter 52 fixed thereto. The igniter 52 when activated ignites an enhancer substance 54 in an enhancer chamber 53 sealed by an end 55. Gasses generated by the burning of the enhancer substance burst the seal 43 igniting the gas generant 42 in the first chamber 40. A portion of the gasses generated by the burning of the gas generant 42 in the first chamber 40 escape from inflator through the vent openings 32 to partially inflate an airbag in a first stage deployment while some of the gasses generated by the burning of the gas generant 42 in the first chamber 40 pass through the openings 7 in the closure 17 of the ignition delay module 10 and ignite the pyrotechnic tablet 2. The pyrotechnic tablet 2 as it burns is consumed or erodes away until the burn inhibitor layer 3 also burns sufficiently to expose the small passages 20 through the end of the cup 13. As these passages 20 are opened the gas generant 42 in the second chamber 40 is ignited. This burning of the pyrotechnic tablet 2 with the unexposed surface having the burn inhibitor layer 3 causes a delay of approximately 10-20 milliseconds in the ignition of the gas generant 42 in the second chamber 40. This is a sufficient delay such that the airbag upon initial inflation with gasses generated by the burning of the gas generant 42 in the first chamber 40 deploys in a rather soft and non-aggressive manner and thereafter once the pyrotechnic tablet 2 is burned away the gas generant 62 within the second chamber 60 ignites to provide additional gasses enabling the airbag to reach full deployment in a second stage.

Figure 4:
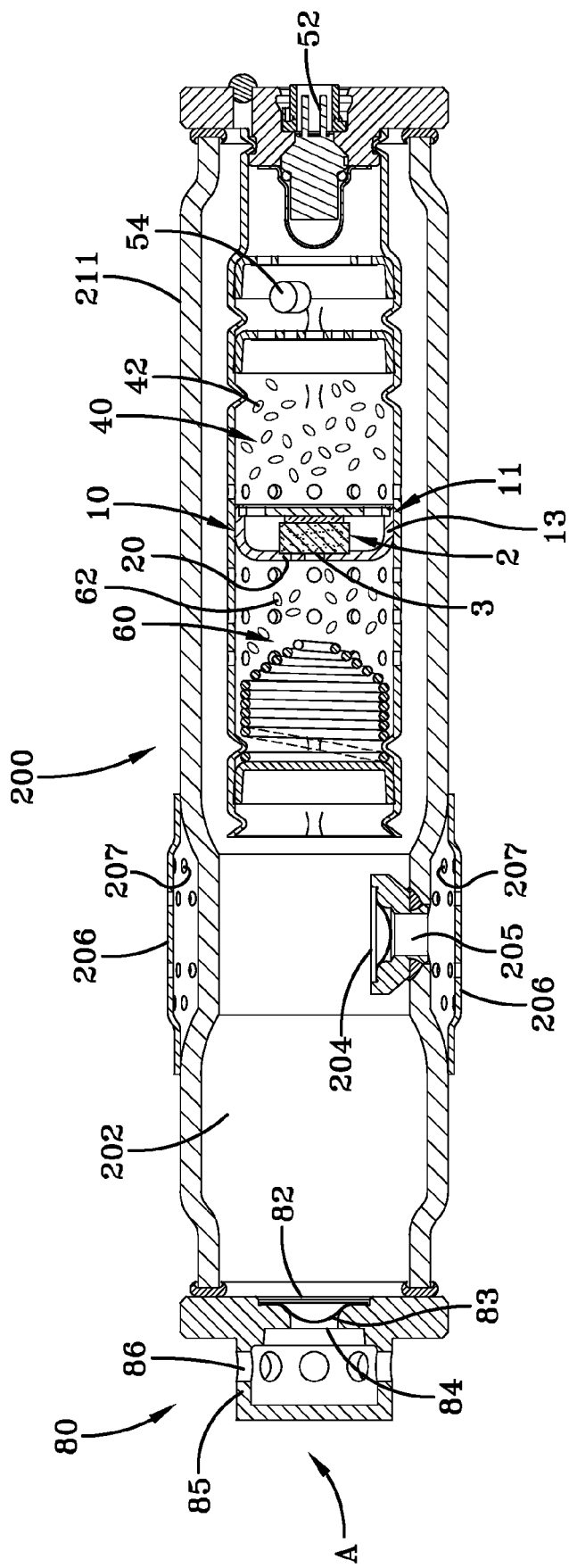
FIG. 4 a cross section of a hybrid inflator with the ignition delay module installed therein.

FIG. 4 shows another type of inflator, called a hybrid inflator that employs an inert gas under pressure in combination with a gas generant to provide the inflation gasses. Hybrid inflators first ignite the gas generant to preheat the inert gas causing a pressure rise in the inflator housing causing a rupture disk to break allowing both the inert gas and the gas generated by the combustion to inflate an airbag. An ignition delay module 10 is shown in a hybrid airbag inflator 200 separating a first chamber 40 containing a generant 42 and a second chamber 60 containing a gas generant 62. The hybrid airbag inflator 200 has an inflator housing 211 that contains inert gasses 202 under pressure. In this hybrid inflator 200 the deployment of an airbag is activated by a single signal to the igniter 52 which will ignite an enhancer substance 54 which in turn ignites the gas generant 42 in the first chamber 40 to generate hot gasses that warms the inert gasses 202 creating an initial rise in pressure prior to bursting a rupture disk 204 to sent inflation gasses through an opening 205 in the inflator housing under a manifold 206 and exhausting through a plurality of holes 207 in the manifold to begin inflating and deploying an airbag. Upon deployment of the airbag caused by the gas generated by burning the gas generant 42 in the first chamber 40 and the inert gas 202 a delay occurs due to the functioning of the ignition delay module 10 separating the first and second chambers 40, 60. As the hot gasses generated by the burning of the gas generant 42 in the first chamber 40 burn through the pyrotechnic tablet 2 and the burn inhibitor layer 3 exposing the passages 20 through the end of the cup 13 of the ignition delay module housing 11 to ignite after a delay the gas generant 62 in the second chamber 60 the stored inert gas 202 is further heated to further increase the pressure of the gasses in the inflator housing for more rapid filling of the airbag. As shown the present invention provides an S-Curve output using a hybrid passenger airbag inflator 200 whereupon sensing a crash a diagnostic module activates the igniter 52. During the deployment of the airbag, the rate that gases exit the inflator 200 is controlled by both the orifice size and the rate that the gas generants burn. The hybrid inflator 200 can have an auxiliary exhaust port 80 at end A wherein if an excessive overpressure occurs a plurality of rupture disks 82, 83 can break allowing gasses to escape through openings 84, 86 in the end cap 85.

Figure 5:
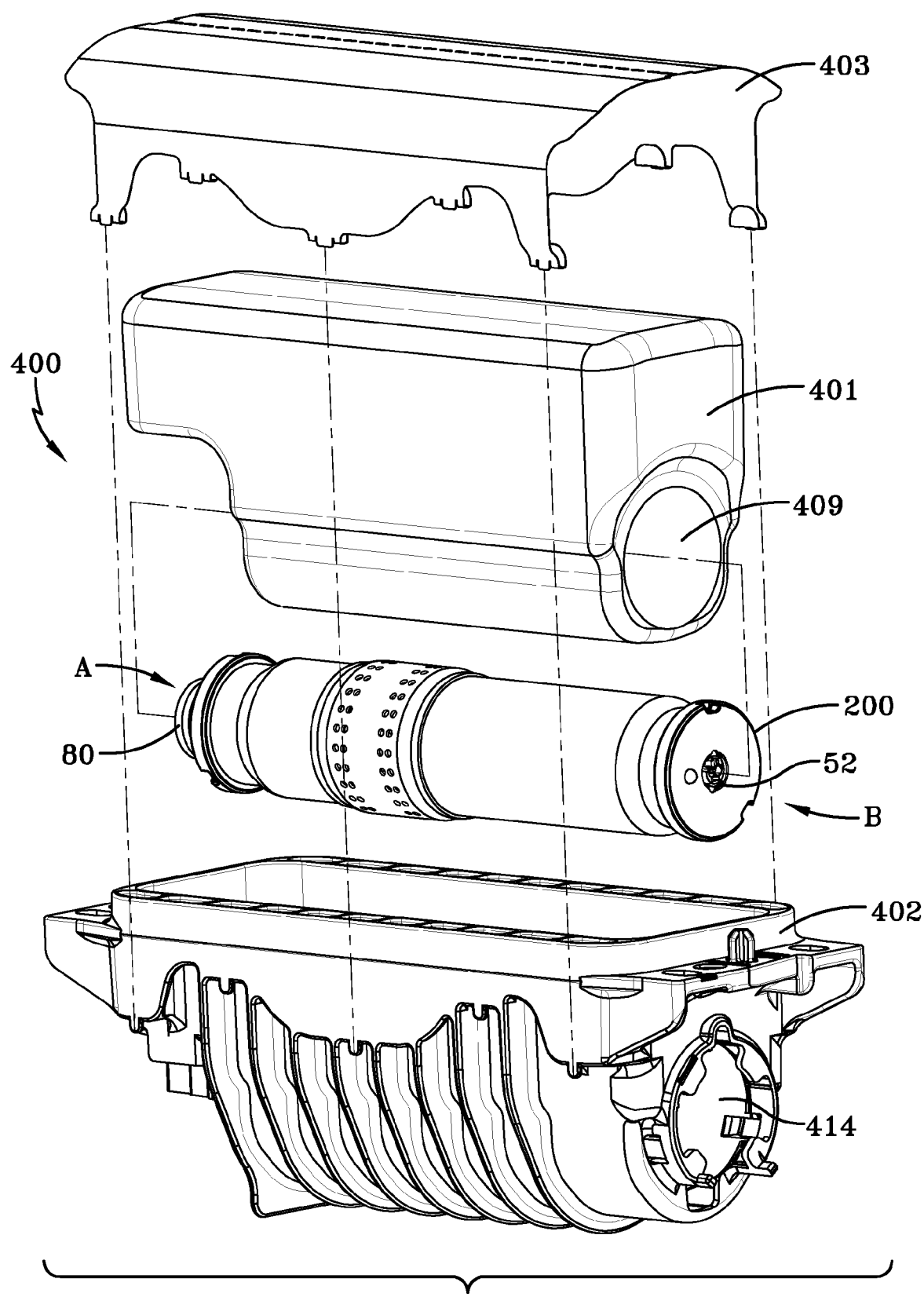
FIG. 5 is an exploded view of the hybrid inflator of FIG. 4 in an exemplary airbag module assembly.

As shown in FIG. 5, an inflator 100, 200 having an ignition delay module according to the present invention can be used as a component of an exemplary airbag module 400 having a cover 403, an airbag 401 and opening 409 to hold the inflator 100, 200 all contained in an airbag module housing 402 having an opening 414 for securing the inflator and providing a wiring access to the igniter 52 at end B of the inflator as shown.

One of the advantages of the use of the ignition delay module 10 is that the openings 7 through the closure 17 of the ignition delay module 10 can be adjusted to be larger or smaller changing the manner in which the pyrotechnic tablet 2 is ignited and burned and changing the amount of time required to burn through the burn inhibitor layer 3. As shown the burn inhibitor layer 3 can be adjusted as well by choosing alternative materials that burn slower or faster or by increasing the amount of coating thickness used on the pyrotechnic tablet 2 so that the delay can be increased or decreased as so desired.

An important advantage of the present invention is that all of the materials currently used in this form of pyrotechnics are those that are already approved for use in such devices. No dramatic change in the formulation has to occur in order for the ignition delay module to work. The gas generant materials 42, 62 and the pyrotechnic tablet 2 used in the ignition delay module 10 can all comprise the same material and as such the avoidance of any toxic materials or potentially unknown ignition materials can be avoided if so desired.

In typical prior art hybrid airbag inflators an igniter ignites an ignition enhancer that then ignites a main heater pyrotechnic charge. As a result there is no significant delay between these three events, less than 1 millisecond in properly designed systems. The present invention provides a reliable programmed delay that can be used to change the portion of a main pyrotechnic charge that is ignited at one time such that the amount of gas generant 42 that is ignited immediately can be reduced. The remaining gas generant 62 in a second chamber 60 will be ignited after the programmed delay time has elapsed. This allows the initial gas output of the inflator 100, 200 to be reduced and after the programmed delay provided by the igniter delay module 10 the gas output of the inflator is increased as desired.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An ignition delay module for an airbag inflator comprising:
   an ignition delay module housing positioned inside the inflator separating the inflator into a first portion and a second portion; and
   a pyrotechnic tablet positioned inside the ignition delay module housing;
   wherein upon igniting the inflator the first portion ignites while the ignition delay module prevents the second portion of the inflator from igniting until at least a portion of the pyrotechnic tablet is burnt.

2. The ignition delay module for an airbag inflator of claim 1 further comprising a burn inhibitor layer on a surface of the pyrotechnic tablet.

3. An ignition delay module for an airbag inflator comprising:
   an ignition delay module housing;
   a pyrotechnic tablet, a burn inhibitor layer on a surface of the pyrotechnic tablet positioned inside the ignition delay module housing;
   wherein upon igniting the inflator, the ignition delay module prevents a second portion of the inflator to ignite until at least a portion of the pyrotechnic tablet is burnt; and wherein the ignition delay module housing when placed in the inflator separates the inflator into two chambers, the ignition delay module housing having a first end with a plurality of openings and a second end with a plurality of openings blocked by the pyrotechnic tablet at the burn inhibitor layer surface.

4. An ignition delay module for an airbag inflator positioned between a first inflator chamber and a second inflator chamber, each chamber having a gas generant contained therein, the ignition delay module comprising:
   an ignition delay module housing, the ignition delay module housing having a first end and a second end and a spaced therebetween the two ends defining a delay chamber,
   a pyrotechnic tablet held inside the delay chamber, and
   wherein the first end has a plurality of openings unobstructed by the pyrotechnic tablet and said second end has a plurality of openings obstructed by a surface of the pyrotechnic tablet, the surface of the pyrotechnic tablet having a burn inhibitor layer that upon an ignition of the gas generant in the first inflator chamber, the pyrotechnic tablet is ignited and burns with the burn inhibitor layer to expose the openings in the second end causing a time delay before igniting gas generant in the second chamber.

5. An airbag inflator comprising:
   an inflator housing;
   an igniter fitted to the inflator housing;
   a gas generating material located within the inflator housing;
   an ignition delay module located in the inflator housing and having an ignition delay module housing separating the gas generating material into a first quantity and second quantity; and
   a pyrotechnic tablet located in the ignition delay module housing and having one surface with a burn inhibitor layer thereon;
   wherein the ignition delay module housing has a first end and second end each end having a plurality of openings, the opening on the first end being unobstructed while the pyrotechnic tablet has the surface with a burn inhibitor covering the openings of the second end to create a delay in igniting the second quantity of gas generating material when the igniter is activated.

6. The airbag inflator of claim 5 wherein the inflator is a pyrotechnic inflator.

7. The airbag inflator of claim 5 wherein the inflator is a hybrid inflator containing an inert gas under pressure and the gas generant separated into the first and the second quantities.

8. An airbag inflator comprising:
   an inflator housing;
   an igniter fitted to the inflator housing;
   a first quantity of a gas generant disposed inside the inflator housing when ignited by the igniter, the inflator housing having openings therethrough that allow gas generated by the first quantity of gas generant escape from the inflator housing;
   a second quantity of a gas generant disposed inside the inflator housing, the inflator housing having openings therethrough that allow gas generated by the second quantity of a gas generant when burned to escape from the inflator housing;
   an ignition delay module disposed within the inflator housing and separating the first quantity of gas generant from the second quantity of gas generant, the ignition delay module comprising an ignition delay module housing having first openings therethrough that communicate with the first quantity of gas generant and second openings therethrough that communicate with the second quantity of gas generant, the ignition delay module housing containing a body comprising a pyrotechnic substance, the body having a surface that is coated with a burn inhibitor layer and the burn inhibitor layer is positioned to completely cover the second openings in the ignition delay module housing while the first openings in the ignition delay module housing are not completely obstructed, the first openings in the ignition delay module housing allow gas generated by the burning of the first quantity of gas generant to enter the ignition delay module housing and ignite the body comprising a pyrotechnic substance, the burning of the body comprising a pyrotechnic substance generating sufficient heat to deteriorate the burn inhibitor layer allowing gas to communicate with and ignite the second first quantity of gas generant.

\* \* \* \* \*